United States Patent [19]

Cox et al.

[11] Patent Number: 5,928,777
[45] Date of Patent: Jul. 27, 1999

[54] HIGH PRESSURE LAMINATES MADE WITH PAPER CONTAINING CELLULOSE ACETATE

[75] Inventors: Stephen Todd Cox; Melvin Glenn Mitchell; Paul Jay Kennedy; Guy Fostine Massie, Jr.; Freddie Wayne Williams, all of Kingsport, Tenn.

[73] Assignee: Eastman Chemical Company, Kingsport, Tenn.

[21] Appl. No.: 09/045,918

[22] Filed: Mar. 23, 1998

Related U.S. Application Data

[62] Division of application No. 08/568,889, Dec. 7, 1995, Pat. No. 5,766,752.

[51] Int. Cl.$^6$ .......................... B32B 23/00; B32B 31/20
[52] U.S. Cl. ................ 428/322.2; 428/508; 428/511; 428/527; 428/530; 428/534; 428/535; 428/536; 428/537.5; 442/412; 162/146; 162/157.6; 264/319; 264/324; 156/308.2; 156/308.6; 156/311
[58] Field of Search ................. 428/322.2, 507, 428/508, 511, 526, 527, 530, 534, 535, 536, 537.5; 442/412; 162/146, 157.6; 156/308.2, 308.6, 309.3, 310, 311; 264/319, 324

[56] References Cited

U.S. PATENT DOCUMENTS

| | | |
|---|---|---|
| 1,631,750 | 6/1927 | McIntosh . |
| 1,829,585 | 10/1931 | Dreyfus et al. . |
| 2,887,429 | 5/1959 | Griggs et al. ............................ 162/146 |
| 2,976,205 | 3/1961 | Snead et al. ............................ 162/157 |
| 3,271,231 | 9/1966 | Moggio et al. . |
| 3,372,084 | 3/1968 | Arledter ................................. 162/128 |
| 3,716,395 | 2/1973 | Bauer et al. . |
| 5,213,883 | 5/1993 | Mehta ..................................... 428/224 |
| 5,505,888 | 4/1996 | Mitchell et al. ........................ 264/138 |
| 5,573,640 | 11/1996 | Frederick et al. ...................... 162/146 |
| 5,631,078 | 5/1997 | Ellery et al. ....................... 428/311.71 |
| 5,662,773 | 9/1997 | Frederick et al. .......................... 162/4 |
| 5,766,752 | 6/1998 | Cox et al. ............................ 428/322.2 |
| 5,779,736 | 7/1998 | Frederick et al. ......................... 8/130 |
| 5,883,025 | 3/1999 | Karstens et al. ........................ 442/344 |

FOREIGN PATENT DOCUMENTS

| | | |
|---|---|---|
| 0 705 680 | 4/1996 | European Pat. Off. . |
| 29 01 143 | 7/1980 | Germany . |

OTHER PUBLICATIONS

Derwent Abstract WPI Acc. No. 75–6945W/42 (Japanese Patent Kokai 124,172/74–Nov. 27, 1974).

A. Sharipdzhanov et al., *Plast. Massy.*, 4, pp. 24–25 (1992).

*Primary Examiner*—Marie Yamnitzky
*Attorney, Agent, or Firm*—Cheryl J. Tubach; Harry J. Gwinnell

[57] ABSTRACT

A high pressure laminate is made of several layers of paper, including from bottom to top core sheets, a decor sheet and an overlay sheet. The core sheets are either composed of cellulose fibers or composed of 30 to 90 weight percent cellulose acetate fibers and 70 to 10 weight percent cellulose fibers. The core sheets are respectively coated with either a lamination polymer or a plasticizer. The decor sheet is composed of a mixture and a conventional amount of paper making dye. The mixture comprises 30 to about 90 weight percent cellulose acetate fibers, 10 to 70 weight percent cellulose fibers and 0 to 20 weight percent fillers. The decor sheet is coated with a plasticizer. The overlay sheet is composed of cellulose fibers and is coated with a lamination polymer. Upon application of heat and pressure to the several layers a laminate is formed having thermoplastic properties, improved postformability and a significant reduction in the release of volatile organics during formation.

6 Claims, No Drawings

HIGH PRESSURE LAMINATES MADE WITH PAPER CONTAINING CELLULOSE ACETATE

This is a divisional application of application Ser. No. 08/568,889, filed Dec. 7, 1995, now U.S. Pat. No. 5,766,752.

TECHNICAL FIELD

This invention relates to high pressure laminates, and more particularly to the composition of core and decor sheets therein for improved postformability of the laminates and methods of preparation thereof.

BACKGROUND OF THE INVENTION

High pressure laminates are laminated articles typically made of a plurality of core sheets, a decor sheet and an overlay sheet. The sheets are coated with lamination polymers which are typically thermosetting materials, such as melamine or phenolic resins.

The core sheets are made from unbleached kraft paper and are dark in color. The number of core sheets used depends on the application requirements, i.e. strength and environment, and the desired thickness of the laminate. Laminates have a thickness ranging from 0.030 to 0.090 inch. The core sheets are typically saturated with phenolic resins.

The decor sheets are typically made of very heavy paper comprised of cellulose fibers and an opacifying pigment such as titanium oxide. The decor sheets are printed upon with designs to create the decorative pattern of the laminate. The decor sheets are typically saturated with melamine resins.

The overlay sheets are clear cellulose sheet which act as a protective layer over the decor sheet. These sheets are usually saturated with melamine resins. The overlay sheets are used optionally depending on the need for protective surfaces.

In a typical process for preparing laminates, the sheets are saturated with the appropriate thermoset resins and then stacked. Next they are placed in a press and subjected to temperatures of about 150° C. and pressures of about 1100 to 1200 psi for a particular period of time. However, during processing the resins release volatiles causing environmental concern. The melamine resins typically release phenolic volatiles and the phenolic resins release formaldehyde volatiles.

The laminates that are produced are thermoset products due to the nature of the resins employed in the process. For flat surface applications irreversibility after formation and cure creates no problems. However, some applications have curved surfaces and require that the laminates be flexible to allow for a tailored fit in a particular place. This property is known in the industry as postformability and is measured by the inch radius of the bend of the laminate in the postforming unit. The smaller the radius achievable without cracking, the better the postformability. The current industry standard is 0.25 inch radius which provides only minimal flexibility.

Postformability is obtained by only partially curing the laminates prior to application. The partially cured state creates some flexibility in the laminates. After fitting the laminates in place, full cure is completed by the application of heat. Once fully cured the laminate is set and cannot be adjusted. Thus if mistakes are made, the laminates must be discarded and replaced resulting in considerable material waste and higher costs.

Thus, there exists a need in the art for a high pressure laminate that does not release any volatiles during processing, that has more flexibility providing for a wider range of applications, and that remains adjustable after full cure.

SUMMARY OF THE INVENTION

A high pressure laminate comprises a plurality of core sheets, a decor sheet and an overlay sheet. The core sheets are composed of 30 to 90 weight percent cellulose acetate fibers and 70 to 10 weight percent cellulose fibers and are coated with either a lamination polymer or a plasticizer. The decor sheet is composed of a mixture and a conventional amount of paper making dye. The mixture comprises 30 to about 90 weight percent cellulose acetate fibers, 10 to 70 weight percent cellulose fibers and 0 to 20 weight percent fillers. The decor sheet is coated with a plasticizer. The overlay sheet is composed of cellulose fibers and is coated with a lamination polymer. Upon application of heat and pressure a laminate is formed having thermoplastic properties, improved postformability and a significant reduction in the release of volatile organics during formation.

DETAILED DESCRIPTION OF THE INVENTION

A high pressure laminate having improved postformability is made from the application of heat and pressure to layers of various types of sheets of paper. The sheets are made using standard papermaking techniques and chemistry. Some of the sheets comprise cellulose ester fibers in addition to cellulose fibers, such sheet being coated with plasticizer prior to formation of the laminate. The use of heat and pressure convert the layers of sheets into a laminate having thermoplastic properties. Technology regarding the conversion of paper comprising cellulose ester fibers and cellulose fibers into a thermoplastic material is disclosed in U.S. Pat. No. 5,631,078 to Ellery et al. and is herein incorporated by reference.

The laminate is formed from top to bottom with the following layers: (a) an overlay sheet composed of cellulose fiber, (b) a decor sheet composed of cellulose and cellulose ester fibers, and (c) several core sheets that are either composed of cellulose fibers or cellulose and cellulose ester fibers. The sheets containing only cellulose fibers are coated with a conventional lamination polymer, usually either a melamine or phenolic resin depending on the application. The sheets containing both cellulose and cellulose ester fibers are coated with a plasticizer that is compatible with the particular cellulose ester in the sheet.

In one embodiment of the invention only the decor sheet contains both cellulose and cellulose ester fibers, while the core and overlay sheets contain cellulose fibers. The decor sheet is a paper made using conventional papermaking techniques. The decor sheet is composed of a mixture comprising from about 30 to about 90 weight percent cellulose ester fibers, from about 10 to about 70 weight percent cellulose fibers and from 0 to about 20 weight percent fillers, based on the total weight of the cellulose ester fibers, the cellulose fibers and the fillers. Prior to creating the paper, a conventional amount of a papermaking dye is added to the mixture. This is typically 7 pounds of dye per 2000 pounds of mixture. The paper, thus created, is coated with a cellulose ester plasticizer prior to layering it with the other sheets.

Preferably, the decor sheet comprises from about 30 to about 70 weight percent cellulose ester fibers, from about 15 to about 55 weight percent cellulose fibers and from about 15 to about 20 weight percent fillers. More preferably, the mixture comprises about 50 weight percent cellulose ester fibers, about 30 weight percent cellulose fibers and about 20 weight percent fillers. The fillers are those conventionally used in the papermaking industry for making a sheet of paper opaque. Preferably, the fillers are selected from the group comprising titanium dioxide, clay and calcium carbonate.

In another embodiment of the invention the decor sheet and core sheets contain both cellulose and cellulose ester fibers, while only the overlay sheet contains cellulose fibers. The core sheets are composed of from about 30 to about 90 weight percent cellulose ester fibers and from about 70 to about 10 weight percent cellulose fibers. The decor sheet is the same as described above. The core sheets and decor sheet are coated with a plasticizer and the overlay sheet is coated with a lamination polymer prior to layering the sheets together. During the formation of the laminate by the application of heat and pressure to this combination of sheets and coatings, there is a significant reduction in the release of volatile organics due to the elimination of melamine and phenolic resins in two of the three layers.

In this embodiment the core sheets are preferably composed of about 50 weight percent cellulose ester fibers and about 50 weight percent cellulose fibers and the decor sheet is composed of the mixture comprising about 50 weight percent cellulose ester fibers, about 30 weight percent cellulose fibers and about 20 weight percent fillers.

A measure of the thermoplastic nature of the resulting laminates described above is in their postformability. This property is measured as the radius of the laminate bend in a postforming unit, using the formability test method established by NEMA (National Electrical Manufacturers Association), Standards Publication LD3-1991. For the laminate of the present invention the radius of the laminate bend is preferably less than 0.25 inches.

The cellulose ester fibers are preferably cellulose acetate, cellulose acetate butyrate and cellulose acetate propionate. The more preferred cellulose ester is cellulose acetate.

The cellulose acetate fibers utilized in this invention are preferably diester fibers with an acetyl content of 34 to 41 weight percent. The fibers may have a round or trilobal cross section. The fibers may or may not be surface hydrolyzed. The cellulose fibers utilized in the invention are typically standard hardwood or softwood pulp fibers.

The preferred cellulose acetate fibers are those surface hydrolyzed cellulose acetate fibers that are in the paper composition as disclosed in U.S. Pat. No. 5,573,640 to Frederick et. al. These cellulose acetate fibers have a sheath of regenerated cellulose being from about 4 to about 15 weight percent of the weight of the cellulose acetate fibers and a core of cellulose acetate. The cellulose acetate fibers contain no substantial crimp, have an average length from about 1 to 7 mm, a density from about 1.20 to 1.35 gm/cc, a denier from about 1 to 30 gm9,000 meters and a uniform dispersion index of less than 0.15. These surface hydrolyzed cellulose acetate fibers are preferably made in accordance with U.S. Pat. No. 5,779,736 to Frederick et al. or U.S. Pat. No. 5,662,773 to Frederick et al.

In another preferred embodiment of the invention the cellulose acetate fibers of the film are not surface treated and are like those in the paper composition disclosed in U.S. application Ser. No. 08/375,766 filed Jan. 19, 1995 (now abandoned). These cellulose acetate fibers are uniformly dispersed, have a weighted average length in the range of 1 to 7 mm, have a density in the range of 1.20 to 1.35 gm/cm, have a denier in the range of 1 to 30, have a range of 0.1 to 0.2 weight percent lubricant thereon, exhibit no substantial fibrillation and have a uniform dispersion index of 0.15. The preferred method of preparing these cellulose acetate fibers with no surface treatment is disclosed in U.S. Pat. No. 5,505,888 to Mitchell et al.

The plasticizer employed in accordance with this invention may be any plasticizer composition that is compatible with cellulose esters and that causes the cellulose ester and cellulose containing paper to convert to a thermoplastic material with the application of heat and pressure. For cellulose acetate, the preferred plasticizers are toluenesulfonamide derivatives, phthalates and triacetin.

The amount of plasticizer coated on the decor and/or core sheets is that which is enough to convert the paper to a material having thermoplastic properties and is preferably in the range of 20 to 100 weight percent based on the weight of the cellulose ester fiber. This amount of plasticizer employed is generally an amount which wets the paper such that the plasticizer has penetrated the thickness of the paper, but has not necessarily wetted the paper to the point at which it can contain no more plasticizer.

The application of heat and pressure to the layers of sheets is that which is conventional in the preparation of high pressure laminates. Preferably, the temperature is applied at about 150° C. and the pressure is applied at 900 psi.

The films of this invention and their preparation are illustrated by the following examples.

EXAMPLE 1

The laminate structure was layered from top to bottom with one sheet of industry standard overlay, one sheet of Eastman decor sheet and three sheets of industry standard core sheets. The industry standard overlay and core sheets, available from Nevamar Division of International Paper Co., Inc. at Odenton, Md., were made of conventional cellulose fibers and other additives used in standard papermaking processes and were coated with a conventional thermoset bonding resin.

The Eastman decor sheet was made of 50 weight percent (wt %) cellulose acetate fibers and 50 wt % cellulose fibers with a basis weight of 100 lbs per 3000 ft$^2$. The Eastman decor sheet was not treated in any manner.

The laminate was assembled and pressed using a cold-to-cold press cycle. The press temperature was ramped up slowly to 150° C. The press pressure of 1000 psi was applied at the outset. The length of exposure at maximum temperature and pressure was 5 minutes. This example demonstrated the comparability of the Eastman decor sheet with the conventional thermoset laminate technology. The resulting laminate as expected had no flexibility.

EXAMPLE 2

The laminate structure and the composition of the Eastman decor sheet were the same as that set forth in Example 1. The Eastman decor sheet was treated with an industry standard melamine solution consisting of 52 wt % Cymel 412 (a spray-dried melamine resin), 5 wt % isopropyl alcohol, 0.5 wt % magnesium chloride and 42.5 wt % warm water. The industry standard overlay and core sheets were also coated with the melamine solution.

The laminate was assembled and pressed using a cold-to-cold press cycle. The press temperature was ramped up slowly to 163° C. The press pressure of 1000 psi was applied at the outset. The length of exposure at maximum temperature and pressure was 3 minutes. This example demonstrated compatibility between the cellulose acetate containing sheets and the melamine resin used in the laminate industry.

EXAMPLE 3

The laminate structure and the composition of the Eastman decor sheet were the same as that set forth in Example 1. The industry standard overlay and core sheets were coated with a conventional thermoset bonding resin.

The Eastman decor sheet was treated with a diethylphthalate(DEP)/isopropyl alcohol solution. The DEP to cellulose acetate ratio was 1:1 by weight. The isopropyl alcohol was used as a solvent to evenly distribute the DEP within the piece of paper. The alcohol was removed via heat. When utilizing a metering system, the alcohol solvent would be unnecessary.

The laminate was assembled and pressed under the identical conditions listed in Example 1. The resulting laminate retained its thermoset nature from the resins in the core and overlay sheets. However, the use of plasticizer on the Eastman decor sheet did provide for increased postformability.

EXAMPLE 4

The laminate structure and the composition of the Eastman decor sheet were the same as that set forth in Example 1. The industry standard overlay and core sheets were coated with a conventional thermoset bonding resin.

The Eastman decor sheet was treated first with DEP/isopropyl alcohol solution (DEP to cellulose acetate ratio was 1:1 by weight) as set forth in Example 3 and then with a melamine solution identical in composition to that in Example 2.

The laminate was assembled and pressed under the identical conditions listed in Example 2. This example was used to prove compatibility between a plasticizer treated cellulose acetate containing paper and an industry standard melamine treatment.

EXAMPLE 5

The laminate structure was the same as that set forth in Example 1. The industry standard overlay and core sheets were coated with a conventional thermoset bonding resin.

The Eastman decor sheet was made of a mixture of 60 wt % cellulose acetate fibers, 24 wt % cellulose fibers and 16 wt % fillers (titanium dioxide, clay, and calcium carbonate) and a conventional amount of standard paper industry dye (about 7 lbs per 2000 lbs mixture). The sheet had a basis weight of 45 lbs per 3000 ft$^2$. The Eastman decor sheet was treated with an ethyltoluenesulfonamide plasticizer at a cellulose acetate to plasticizer ratio of 1:0.65.

The laminate was assembled and pressed under the identical conditions listed in Example 1. This example demonstrated that opacity can be obtained using a cellulose acetate containing paper.

EXAMPLE 6

The laminate structure was layered from top to bottom with one sheet of industry standard overlay, one sheet of Eastman decor sheet and three sheets of Eastman Kraft core. The industry standard overlay was coated with a conventional thermoset bonding resin.

The Eastman decor sheet had the same composition as that set forth in Example 1. The Eastman Kraft core was made of 50 wt % cellulose acetate fibers and 50 wt % cellulose fibers with a basis weight of 150 lbs per 3000 ft$^2$. Both papers were treated with DEP/isopropyl alcohol solution. DEP to cellulose acetate ratio was 1:1 by weight. The alcohol was removed via heat.

The laminate was assembled and pressed under the identical conditions listed in example 1. This example demonstrated the capability of a cellulose acetate plasticizer treated sheet to function as a core material replacement.

EXAMPLE 7

The laminate structure was layered from top to bottom with one sheet of industry standard overlay, one sheet of Eastman decor sheet and three sheets of industry standard core. The overlay and core sheets were coated with a conventional thermoset bonding resin. The Eastman decor sheet had the same composition and was treated in the same manner as that set forth in Example 3.

This example was assembled and pressed under the identical conditions outlined in Example 1. After the resulting laminate had conditioned for the appropriate time, it was postformed under the formability test method established by NEMA (National Electrical Manufacturers Association), Standards Publication LD3-1991. The piece postformed to 0.125 inch radius. This example demonstrated an increase in postformability over conventional high pressure laminates.

EXAMPLE 8

The laminate structure was layered with four Eastman decor sheets having the same composition as that in Example 1. The sheets were treated with a triacetin/isopropyl alcohol solution. Triacetin to cellulose acetate ratio was 0.5:1 by weight.

The material was pressed under the identical condition set forth in example 1. After the resulting laminate had conditioned for the appropriate time, it was postformed under the formability test method established by NEMA (National Electrical Manufacturers Association), Standards Publication LD3-1991. The laminate postformed to 0.125 inch radius.

The high pressure laminates of the present invention made from decor sheets and core sheets comprised of cellulose ester and cellulose fibers and coated with plasticizers provide significant processing and property advantages over the prior art thermoset laminates. In preparing the laminates of the present invention, the substitution of plasticizers for thermoset bonding resins substantially reduces the harmful volatiles released during processing. The laminates having plasticizers as the lamination polymer rather than resins are more flexible for increased postforming capabilities and are also adjustable after cure to allow for corrections in application. Thus, these high pressure laminates are easier to use and result in less material waste.

The invention has been described in detail with particular reference to preferred embodiments and methods thereof, but it will be understood that variations and modifications can be effected within the spirit and scope of the invention.

What is claimed is:

1. A laminate comprising
   a plurality of core sheets composed of from about 30 to about 90 wt % cellulose acetate fibers and from about 70 to about 10 wt % cellulose fibers and coated with a plasticizer, a decor sheet composed of a mixture comprising from about 30 to about 90 wt % cellulose ester fibers, from about 10 to about 70 wt % cellulose fibers and from 0 to about 20 wt % fillers, based on the total weight of said cellulose ester fibers, said cellulose fibers and said fillers, said mixture further comprising, a cellulose ester plasticizer coated on said decor sheet, and an overlay sheet composed of cellulose fibers and coated with a lamination polymer, whereby upon application of heat and pressure a laminate is formed having thermoplastic properties and improved postformability.

2. The laminate of claim 1 wherein the laminate has a postformability of less than 0.25 inch radius of the laminate bend in a postforming unit.

3. The laminate of claim 1 wherein said core sheets are composed of about 50 wt % cellulose acetate fibers and about 50 wt % cellulose fibers and said decor sheet is composed of said mixture comprising about 50 wt % cellulose ester fibers, about 30 wt % cellulose fibers and about 20 wt % fillers.

4. The laminate of claim 1 wherein said cellulose ester fibers of said decor sheet have a sheath of regenerated cellulose and a core of cellulose ester.

5. A process for preparing a laminate comprising the steps of:

a) layering together an overlay sheet coated with a lamination polymer, a decor sheet and a plurality of core sheets, said decor sheet and core sheets composed of from about 30 to about 90 wt % cellulose acetate fibers, from about 10 to about 70 wt % cellulose fibers and from 0 to 20 wt % fillers and coated with a plasticizer, b) applying to the layer of sheets from step (a) for a period of time heat of about 150° C. and pressure of about 900 psi, and c) removing from said heat and pressure a laminate having thermoplastic properties and improved postformability.

6. The process of claim 5 wherein the laminate has a postformability of less than 0.25 inch radius of the laminate bend in a postforming unit.

* * * * *

UNITED STATES PATENT AND TRADEMARK OFFICE
CERTIFICATE OF CORRECTION

PATENT NO. : 5,928,777
DATED : July 27, 1999
INVENTOR(S) : Stephen Todd Cox, et al.

It is certified that error appears in the above-identified patent and that said Letters Patent is hereby corrected as shown below:

Column 7, line 6, after "comprising", --- a papermaking dye --- should be inserted.

Signed and Sealed this

Fifteenth Day of August, 2000

Attest:

Q. TODD DICKINSON

Attesting Officer

Director of Patents and Trademarks